(12) United States Patent
Tardy et al.

(10) Patent No.: US 8,260,594 B2
(45) Date of Patent: Sep. 4, 2012

(54) METHOD AND SYSTEM FOR PREDICTING THE APPARENT FLOW CONDUCTIVITY OF A HETEROGENEOUS MEDIUM

(75) Inventors: Philippe Tardy, Stafford, TX (US); Ali Fadili, Abingdon (GB); John Richard Anthony Pearson, Cambridge (GB); John Peter Crawshaw, Newmarket (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 1077 days.

(21) Appl. No.: 10/547,251

(22) PCT Filed: Mar. 18, 2004

(86) PCT No.: PCT/GB2004/001182
§ 371 (c)(1),
(2), (4) Date: Jul. 3, 2006

(87) PCT Pub. No.: WO2004/083827
PCT Pub. Date: Sep. 30, 2004

(65) Prior Publication Data
US 2006/0277011 A1    Dec. 7, 2006

(30) Foreign Application Priority Data
Mar. 20, 2003  (GB) .................................. 0306392.2

(51) Int. Cl.
*G06G 7/50* (2006.01)
(52) U.S. Cl. .......................................................... 703/9
(58) Field of Classification Search ........................ 703/9
See application file for complete search history.

(56) References Cited

FOREIGN PATENT DOCUMENTS
GB     2 342 736 A    4/2000

OTHER PUBLICATIONS

Pearson et al. "Models for Flow of Non-Newtonian and Complex Fluids through Porous Media", Elsevier. Dec. 2001.*
Telega et al. "Stochastic Homogenization and Macroscopic Modelling of Composites and Flow through Porous Media", 2002.*
Zhang et al. "Stochastic analysis of transient saturated flow through heterogeneous fractured porous media: A double-permeability approach", Water Resources Research vol. 36, No. 4, pp. 865-874, Apr. 2000.*
Tartakovsky D et al Dynamics of Free Services in Random Porous Media SIAM Journal of Applied Mathematics vol. 61, No. 6, 2001, pp. 1857-1876.
Fadili A, et al A 3D Filtration Law for Power-Law Fluids in Heterogenous Porous Media Journal of Non-Newtonian Fluid Mechanics vol. 106, 2002, pp. 121-146.
Pearson J et al Models for flow of non-Newtonian and Complex Fluids through Porous Media Journal of Non-Newtonian Fluid Mechanics vol. 102, 2002, pp. 447-473.

(Continued)

*Primary Examiner* — Saif Alhija

(57) ABSTRACT

The invention concerns a method and a system for predicting the apparent flow conductivity of a heterogeneous medium. According to the invention, the following steps are implemented:—choosing a flow conductivity element type with a given set of characteristic parameters;—determining equations for said flow in said element type;—determining a network statistics for said given set of characteristic parameters; and—performing a stochastic homogenisation of said equations, for said network statistics. The invention applies more particularly to the predicting of the apparent viscosity of non-Newtonian fluids in a heterogeneous porous medium.

5 Claims, 8 Drawing Sheets

OTHER PUBLICATIONS

Fadili A et al Stochastic Homogenisation of Fluid Flows in heterogeneous Porous Media Iutam Symposium on Asymptotics, Singularities and Homogenisation in Problems of Mechanics Whole Document, Jul. 2002.

A Fadili Determination of Apparent Rheology in Heterogeneous Porous Media by Stochastic Homogenisation $9^{th}$ Energy Programme Marie Curie Training Fellowship Conference Whole Document, May 2002.

M Singh et al Dynamic Modeling of Drainage through three-dimensional Porous Materials Chemical Engineering Science, Oxford, GB vol. 58, No. 1, Jan. 2003, pp. 1-18.

Tsakiroglou et al Characterisation of the Pore Structure of Reservoir Rocks with the Aid of Serial Sectioning Analysis, Mercury Porosimetry and Network Simulation Advances in Water Resources vol. 23, Jun. 2000, pp. 773-789.

* cited by examiner

METHOD AND SYSTEM FOR PREDICTING THE APPARENT FLOW CONDUCTIVITY OF A HETEROGENEOUS MEDIUM

FIELD OF THE INVENTION

The invention relates to methods and systems for predicting the apparent flow conductivity of heterogeneous media and, in particular, to such methods and systems for predicting the apparent viscosity of non-Newtonian fluids in heterogeneous porous media. The apparent viscosity of non-Newtonian fluids in heterogeneous porous media is a required input to flow simulators such as those used in hydrocarbon reservoir engineering. It permits one to predict performance in field operations and improve their design. Such operations include Enhanced Oil Recovery by injection of polymer and/or surfactant based fluids, Water Control by injection of a sealing gel in water-producing layers, control of leak-off and back-flow characteristics of a fracturing fluid in Hydraulic Fracturing. The method can also be used to model the flow of non-Newtonian crude oils.

STATE OF THE ART

The prediction of the apparent viscosity required to model the flow of non-Newtonian fluids in porous media is the subject of prior literature. The methodology used according to said literature always involves prediction of that parameter from the physics describing the fluid flow at the scale of the pore of the porous material, typically of the order of a few dozen microns for rocks, and from some description of the pore space geometry.

According a first class of methods of the state of the art, the flow at the pore scale is described by Navier-Stokes equations extended with the relevant Rheological Equation Of State (REOS) or Constitutive Equation. Boundary conditions are introduced for describing the interaction between the fluid and the rock matrix making up the porous medium. The geometry of the pore space is not explicit. Equations are, depending on the preferred terminology, homogenized, upscaled or averaged in order to yield larger scale relationships between average fluid pressure and average fluid velocity (Darcy velocity). These equations identify the sought apparent viscosity. However, practically, the lack of geometrical information of the pore space does not allow any explicit quantification of the parameters and the above equations remain theoretical since it is not possible to determine the influence of the pore space geometry on the flow parameters. D. Getachew, W. J. Minkowycz, D. Poulikakos, *Macroscopic Equations of Non-Newtonian Fluid Flow and Heat Transfer in a Porous Matrix*, Journal of Porous Media, 1(3), 1998, pp 273-283; B. Khuzhayorov, J. L. Auriault, P. Royer, *Derivation of Macroscopic Filtration Law for Transient Linear Viscoelastic Fluid Flow in Porous Media*, International Journal of Engineering Science, 38, 2000, pp 487-504; A. Bourgeat and A. Mikelic, *Homogenisation of a Polymer Flow Through a Porous Medium*, Non-Linear Analysis, 26(7), 1996, pp 1221-1253; C. B. Shah, Y. C. Yortsos, *Aspects of Flow of Power-Law Fluids in Porous Media*, AIChE Journal, 41(5), 1995, pp 1099-1112; J. L. Auriault, P. Royer, C. Geindreau, *Anisotropic Filtration Law for Power-Law Fluids*, International Journal of Engineering, 40(10), 2002, pp 1151-1163; M. Lopez de Haro, J. A. del Rio P., S. Whitaker, *Flow of Maxwell Fluids in Porous Media*, Transport in Porous Media, 25, 1996, pp 167-192; and R. G. Larson, *Derivation of Generalized Darcy Equations for Creeping Flow in Porous Media*, Ind. Eng. Chem. Fundam., 20, 1981, pp 132-137.

A second class of methods of the state of the art are similar to the first methods but the pore geometry is made explicit and simplified. The Darcy-scale flow parameters, identified by prior averaging, are solved numerically or analytically. for the geometry called the Representative Elementary Volume (REV) and the overall porous medium is made by stacking REV's next to each other, therefore assuming some periodicity, at a sub-Darcy scale, in the structure of the porous medium. A weakness of these methods is the periodicity assumption.or the spatial regularity of the pore space geometry, which appears,to be not realistic for natural porous media. In addition, the final formula. may not be analytical if it relies on numerical simulations. B. Khuzhayorov, J.L. Auriault, P. Royer, *Derivation of Macroscopic Filtration Law for Transient Linear Viscoelastic Fluid Flow in Porous Media*, International Journal of Engineering Science, 38, 2000, p 497; G. J. F Smit, J. P Du Plessis, *Modelling of Non-Newtonian Flow Through Isotropic Porous Media*, Mathematical Engineering in Industry, 8(1), 2000, pp 19-40; and G. J. F Smit, J. P. du Plessis, *Modelling of Non-Newtonian Purely Viscous Flow through Isotropic High Porosity Synthetic Foams*, Chemical Engineering Science, 54, 1999, pp. 645-654.

According to a third class of methods of the state of the art, more tractable and practical results may be obtained by replacing the porous medium by a bundle of capillaries, which do not intersect each other. In fact, if the REOS of the fluid allows easy integration of the flow in a single capillary, the flow behaviour in the bundle may be determined from the contribution of each capillary. This, and a significant amount of empiricism, yields a simple tractable formula linking flow parameters of the fluid to the properties of the medium, such as hydraulic radius, porosity and tortuosity. These properties are chosen so that the permeability of the bundle matches that of the porous material under investigation. The weakness of the method relies on the additional experimental measurement of empirical parameters such as the shape factor required for the formula to predict the apparent viscosity in real porous media. The formula cannot predict this parameter, which will vary significantly from one author to another, and the parameter varies in an unknown fashion with fluid rheology and porous medium. Additionally, the methodology cannot be applied to fluids with a REOS that does not allow for analytical resolution of the flow within a single capillary. It also does not allow the correlation structure to be taken into account in the distribution of the network parameters. R. P. Chhabra, J. Comiti, I. Machac, *Flow of Non-Newtonian Fluid in Fixed and Fluidised Beds*, Chemical Engineering Science, 56, 2-001 pp 1-27; T. Al-Fariss, K. L. Pinder, *Flow through Porous Media of a Shear Thinning Liquid with a Yield Stress*, Canadian Journal of Chemical Engineering, 65, 1987, pp 391-405; R. H. Christopher, S. Middleman, *Power-Law Flow through a Packed Tube*, I&EC Fundamentals, 4(4), 1965; and G. P. Willhite, J. T. Uhl, *Correlation of the Flow of Flocon Biopolymer with Polymer Concentration and Rock Properties in Berea Sandstone*, Water Soluble polymers for Petroleum Recovery, G. A. Stahl and D. N Schultz (editors), Plenum Press, New York, 1988.

Also, according to a fourth class of methods of the state of the art, network models have been proposed to improve the modelling of real porous media. Existing methods are based on 2D capillary networks sometimes with varying sections or 3D networks constructed from the digitised pore spaces of the medium under investigation. The advantage of network models is their topological resemblance to real natural porous media. Therefore, it is thought that prediction from these models would bear more resemblance to real porous media.

For these methods, the flow-rate pressure-drop relationship must be provided for each capillary and for the fluid in question. Such methods then require numerical solvers to couple the flow-rate pressure-drop relationship of all capillaries in the network. Analytical results based on the network approach have been derived only in the particular cases of Newtonian and power-law fluids in regular and uncorrelated networks using Effective Medium Theory. It was shown that, in the case of power-law fluids, Effective Medium Theory does not work. No attempt has been made to predict analytically the flow parameters in arbitrary networks of arbitrary fluids. Y. C. Yortsos, above referenced; K. S. Sorbie, *Rheological and Transport Effects in the Flow of Law-Concentration Xanthan Solution through Porous Media*, Journal of Colloid and Interface Science, 145(1), 1991 pp 74-89; J. Koplic, *Creeping Flow in Two Dimensional Networks*, Journal of Fluid Mechanics, 119, 1982, pp 219-247; and W. J. Cannella, C. Huh, R. S. Seright, *Prediction of Xanthan Rheology in Porous Media*, $63^{rd}$ Annual Technical Conference and Exhibition of the SPE, Houston Tex., 1988, SPE 18089.

Finally, according to a last class of methods of the state of the art, a numerical resolution of the 3D Navier-Stokes equations combined with the REOS of the fluid for flow in 3D pore spaces has been proposed as a tool for numerically measuring flow parameters. These methods require very large computation times for any realistic simulation and are then not affordable in practice. Therefore, authors have studied simple periodic pore structures that are not strictly relevant to natural porous media. Besides, it is widely admitted that such numerical simulations do not yet predict flow of rheologically complex fluids in arbitrary 3D spaces. In particular, routinely determined REOS fail to describe flow of real fluids in arbitrary 3D spaces. As a result, these methods are not suited for the study of a real, Theologically complex fluids flowing in porous media. This criticism also applies to all above methods as they all make use of Rheological Equations of State. L. Skartsis, B. Khomami, J. L. Kardos, *Polymeric Flow through Fibrous Media*, Journal of Rheology, 36(4), 1992, pp 589-620; and L. Skartsis, B. Khomami, J. L. Kardos, *Resin Flow through Fiber Beds during Composite Manufacturing Processes: Part II-Numerical and Experimental Studies of Newtonian Flow Through Ideal and Actual Fiber Beds*, Polymer Engineering Science, 32, 1992, pp 231-239.

In addition to the limitations stated above, one is due to a fundamental limit of knowledge from the scientific community. in the area of Theological characterization. It is admitted that state of the art computational tools combined with state of the art scientific knowledge on fluid rheology still do not allow for accurate prediction of the fluid behaviour of real complex fluids such as elastic fluids. Since all the above methods require the REOS as an input for the prediction of the apparent viscosity, and as any REOS will fail when predicting the flow of real complex fluids, the above methods are limited to Theologically simple fluids.

SUMMARY OF THE INVENTION

Considering the above, one problem that the invention is proposing to solve is to carry out a method for predicting the apparent viscosity of non-Newtonian fluids, for flow in heterogeneous media, which is neither empirical nor numerical.

The proposed solution to the above problem is, according to a first aspect of the invention, a method for predicting the apparent flow conductivity of a heterogeneous medium, characterised in that said method comprises the following steps:—choosing a flow conductivity element type with a given set of characteristic parameters;—determining equations for said flow in said element type;—determining a network statistics for, said given set of characteristic parametdrs; and—performing a stochastic homogenisation of said equations, for said network statistics.

More particularly, this method relates to a method for predicting the apparent viscosity of a non-Newtonian fluid in a porous medium, characterised in that said method comprises the following steps:—choosing a capillary type with a given set of geometrical parameters;—determining flow equations for said capillary type and said non-Newtonian fluid;—determining a network statistics for said given set of geometrical parameters characterising the capillary type; and—performing a stochastic homogenisation of said flow equations, for said network statistics.

According to a second aspect, the invention concerns a system for predicting the apparent flow conductivity of a heterogeneous medium, characterised in that said system comprises a processor and a data storage memory for determining a network statistics of a given set of characteristic parameters of a chosen flow conductivity element type and for performing a stochastic homogenisation of equations determined for said flow in said element type.

More particularly, this system concerns a system for predicting the apparent viscosity of a non-Newtonian fluid in a heterogeneous porous medium, characterised in that said system comprises a processor and a data storage memory for determining a network statistics of a given set of geometrical parameters of a chosen capillary type and for performing a stochastic homogenisation of equations determined for said flow in said capillary type.

The network statistics can be seen as a result of an statistical evaluation or a statistical representation of a model made up as a network of pores and capillaries of chosen parameters and geometries.

The apparent viscosity is given by an analytical formula, which depends on the statistics of the network. It does not involve any numerical simulation and does not contain any empirical correlation.

DRAWINGS

The invention will be better understood in the light of the following description of non-limiting and illustrative embodiments, given with reference to the accompanying drawings, in which.

Figure 6:
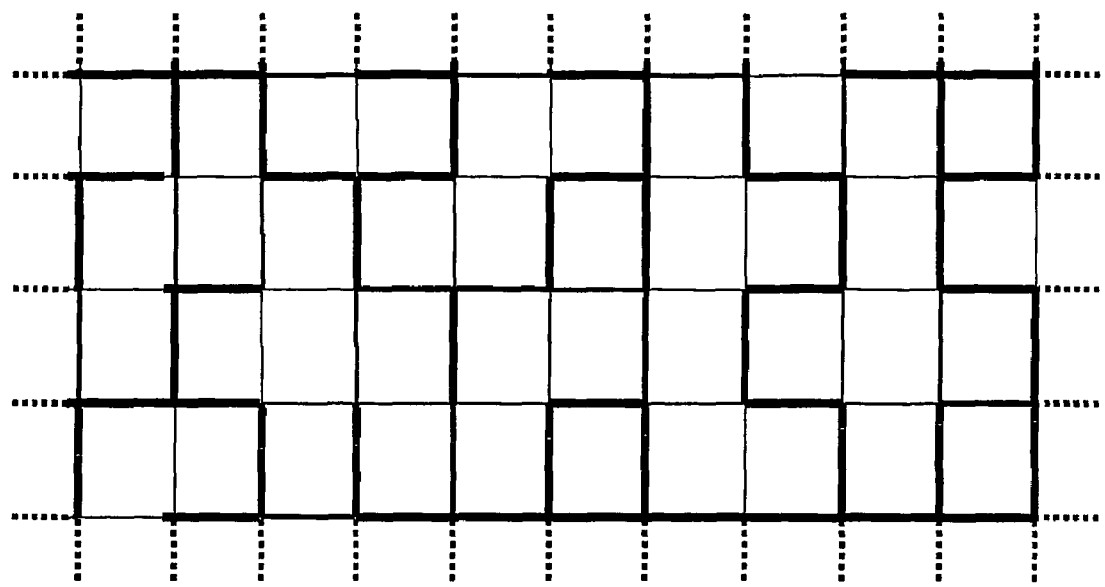
Figure 7A:
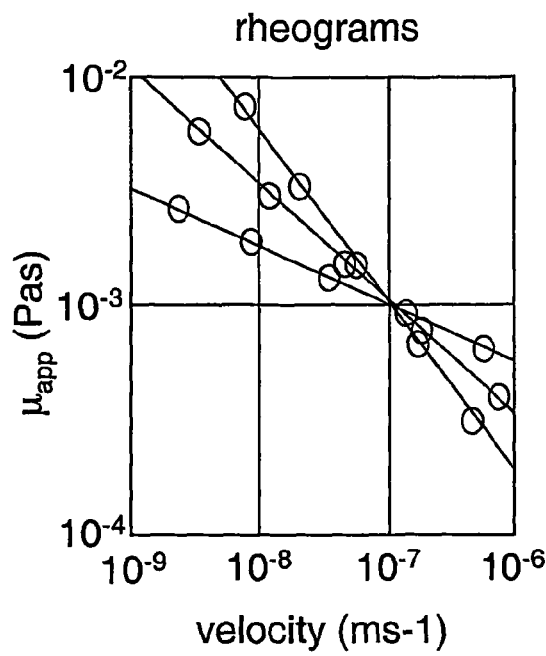
Figure 7B:
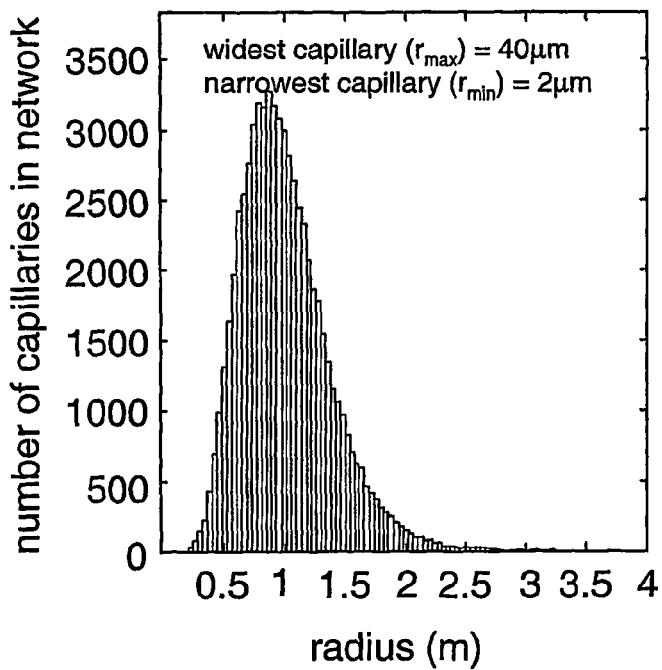
Figure 7C:
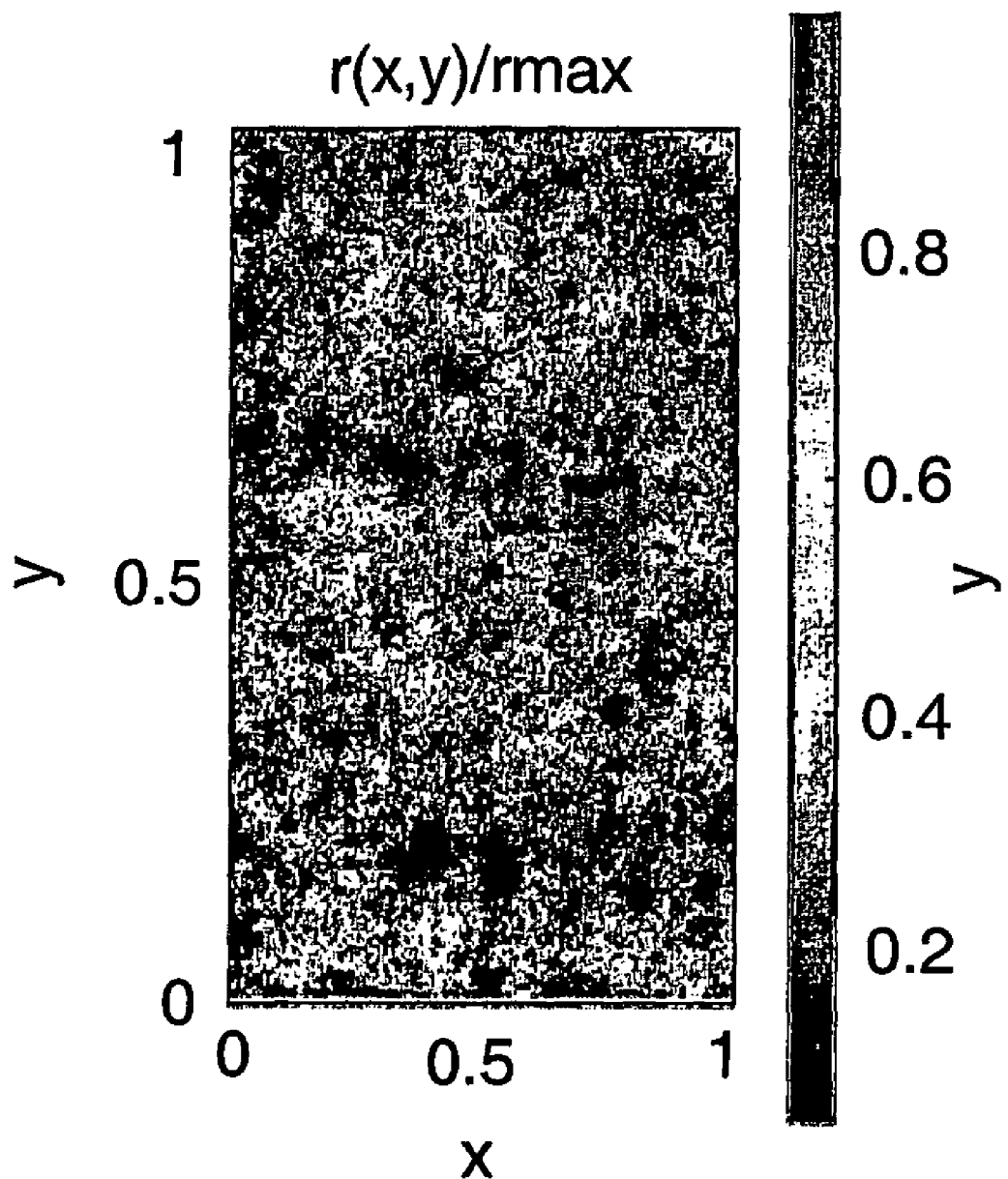

FIG. 6 shows a sample of the Cartesian network used to validate the method, consisting of straight capillaries of equal length and varying radius; and FIGS. 7A, 7B and 7C show, respectively, comparisons between apparent viscosities obtained through stochastic homogenisation (solid lines) and those obtained by numerical simulation (circles) for three values of the power-law exponent (n=0.25, n=0.5, n=0.75); the probability density function (pdf) of the radii of the capillaries; and realization of the spatial distribution of the horizontal capillary radius.

MODE(S) FOR CARRYING OUT THE INVENTION

The method of the invention proposes a stochastic homogenisation of network flow equations to predict apparent flow conductivity of a heterogeneous medium. Said conductivity may be conductivity to temperature, to electricity or a hydraulic conductivity. In the later case, the method of the invention proposes a stochastic homogenisation of network flow equations to predict apparent flow viscosity of a non-Newtonian fluid in a heterogeneous porous medium.

A Newtonian fluid is a fluid whose shear viscosity is constant and for which, the shear viscosity is the only fluid parameter needed to describe its flow. All other fluids are called non-Newtonian fluids.

Figure 1:
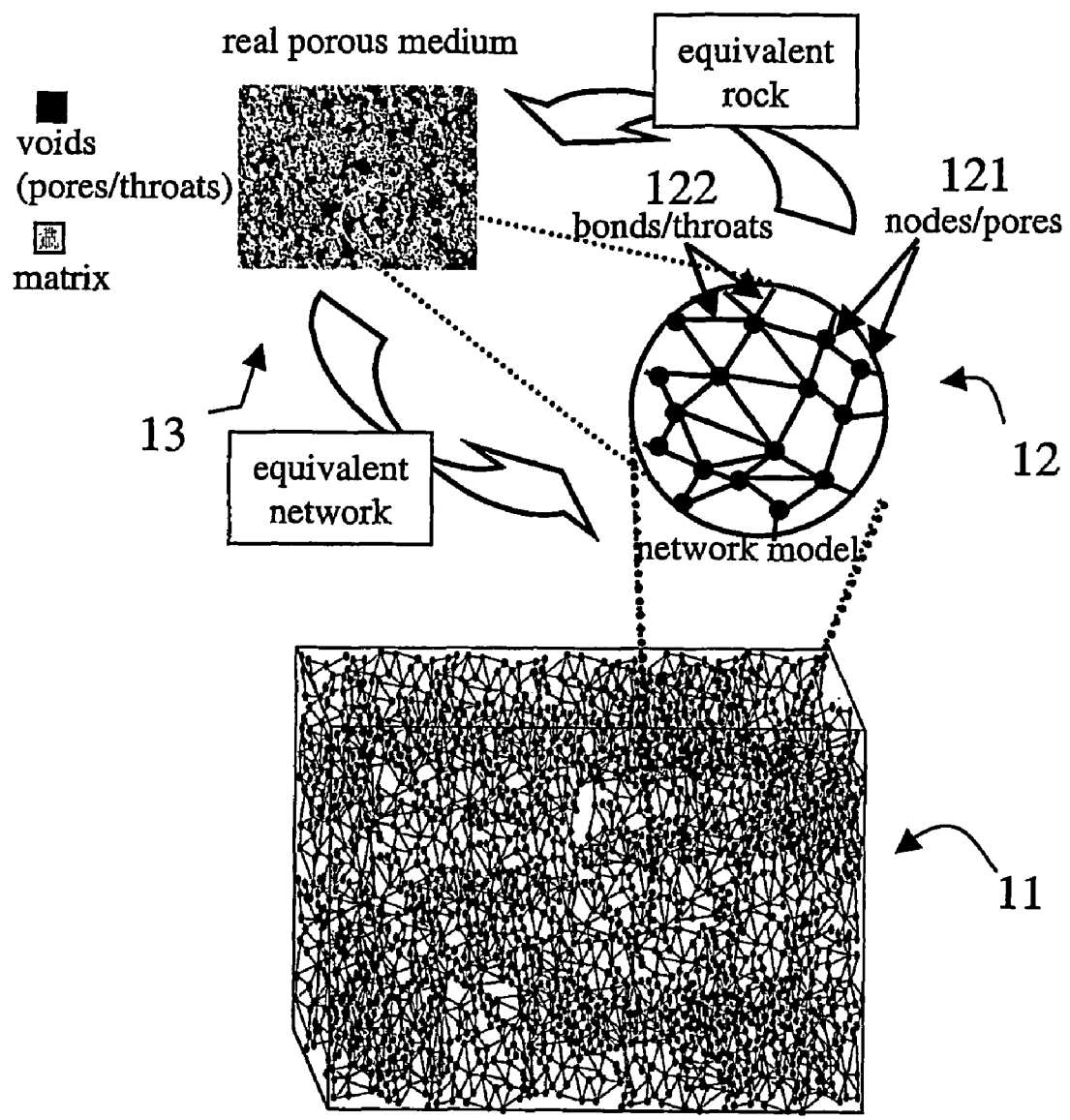
FIG. 1 illustrates the network representation of the real pore network of a porous medium, wherein nodes and throats replace pores -by bonds or capillaries and wherein the equivalency between network and porous medium is obtained though the network optimisation stage.

A network is a set of capillaries, of variable shape and cross-section, arbitrarily distributed in a three-dimensional (3D) space and linked to each other by a set of nodes. Capillaries can also be called throats or bonds and nodes can also be called pores or pore bodies. The network is aimed at mimicking the pore space of a real porous medium as shown in FIG. 1 which is an illustration of a network model 11. An enlarged section 12 is shown to illustrate nodes or pores depicted as dots 121 connected by capillaries or throats depicted as lines 122. The model aims at emulating the flow conditions of a real porous rock shown as a microscopic image 13 in which darker regions are voids (throats or pores) in a matrix of rock (lighter regions).

Figure 2:
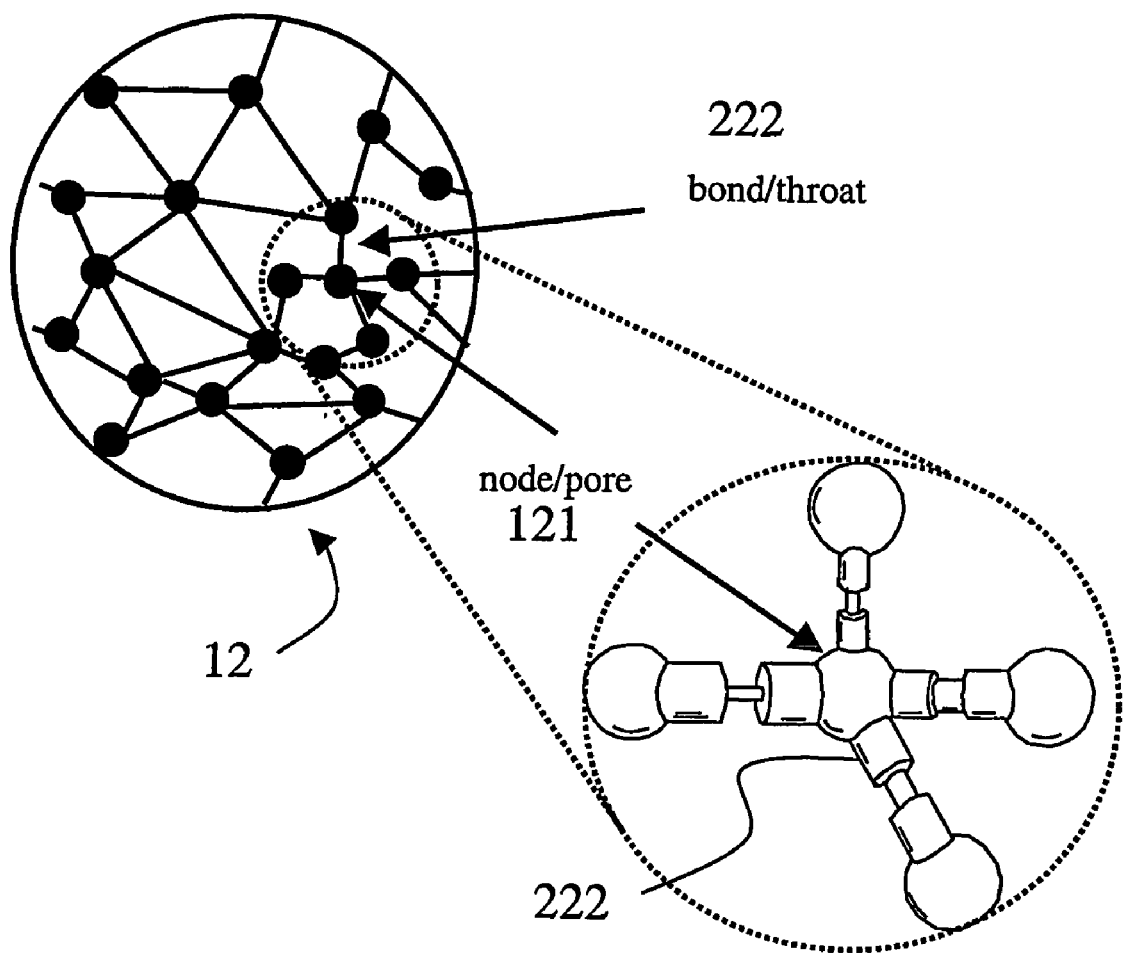
FIG. 2 illustrates the geometry of the bonds or throats in the network formed by contraction-expansion flow units giving rise to both shear- and elongation- flows.

A special case of the model of FIG. 1 is illustrated in FIG. 2, which shows an enlarged section 22 of the enlarged section 12. The capillaries or throats 221 in the variant of FIG. 4 are modelled as having a varying diameter along their length.

The flow equations are a set of equations describing the flow-rate pressure-drop relationship for any capillary of the particular studied fluid, plus an equation stating the volume or mass conservation of said fluid at any node. These are the equations to be solved to predict the apparent viscosity at the network scale.

A stochastic homogenisation is a method for predicting effective or averaged flow parameters from the spatial distribution of local flow parameters. In the context of the networks, local flow parameters are fluid and capillary parameters involved in the network equations. Averaged flow parameters are the parameters at the network scale (Darcy scale) involved in the flow-rate pressure-drop relationship. These are the sought parameters.

Flow parameters are fluid (Theological) and network (e.g. capillary dimensions and coordination number) parameters.

The Darcy's law models a fluid flow in a porous media. For a single Newtonian fluid, this law takes the following form:

$$V = -\frac{k}{\mu} \nabla p \quad (1)$$

where V is the fluid filtration velocity, p is the fluid pressure, $\mu$ is the fluid viscosity and k is the permeability of the porous medium. For a Newtonian fluid, $\mu$ is constant and can be measured by any conventional rheological technique. The permeability k is only defined for Newtonian fluids, and depends on the porous medium nature only.

When a non-Newtonian fluid is considered, equation (1) cannot be used without ambiguity as the viscosity of the fluid varies with the modulus of V. It is therefore customary to extend (1) by introducing an apparent viscosity for the fluid under consideration:

$$V = -\frac{k}{\mu_{app}} \nabla p. \quad (2)$$

The apparent viscosity $\mu_{app}$ is an unknown quantity and varies with the modulus of V, the nature of the porous medium or rock and from one fluid to another.

The method of the invention permits one to predict $\mu_{app}$ for any given fluid F and any given porous medium M. It comprises the following steps.

In a first step, a capillary type, with a given set of geometrical parameters, is chosen for the network. Flow in porous media involves shear flow and elongation flow. Capillaries should be capable of reproducing the range of shear and elongation rates encountered in porous media. Shear is to be captured if the fluid F has a shear-dependent viscosity and, elongation too, if F is an elongation-sensitive fluid. In the latter case, the network capillaries can therefore be made of axi-symmetric contraction-expansion capillaries, as illustrated in FIG. 2. Otherwise, the capillaries can be chose as circular straight capillaries, as illustrated in FIG. 1.

In a second step, flow equations for said capillary type and said non-Newtonian fluid are determined either experimentally through single capillary-flow results or through using a direct simulation on said capillary type. Importantly, the effective conductance c of the chosen capillary type is measured experimentally. The experimental measurement avoids the fundamental problem of determining the REOS of fluid F, as mentioned above. The fluid is therefore to be injected in a single capillary and at different flow-rates, the corresponding pressure-drops across the capillary being experimental outputs. This information leads directly to the measure of the capillary conductance for fluid F. By repeating these experiments for different capillary dimensions and, possibly, respecting the statistical aspect mentioned in the third step, more conductances can be measured. It is then important to model the conductance c as an analytical function of fluid rheological properties and capillary dimensions. This function is to be averaged through stochastic homogenisation for predicting $\mu_{app}$, and it has to be analytical for $\mu_{app}$ to be analytical. The analytical nature of $\mu_{app}$ is essential for the rapidity of the overall process. The modelling of c requires experience and intuition. Some conventional rheological characterizations of fluid F are required for this modelling.

In a third step, a network statistics for the given set of geometrical parameters characterising the capillary type is determined. The statistics of the network are constructed in order to match any information known on the porous medium M. Information includes porosity, pore-size statistics: probability density function and spatial correlation function, throat-size statistics: probability density function and spatial correlation function, coordination number: probability density function and spatial correlation function, and can be determined from thin-section analysis for instance. Porosity can be matched by changing the volumes of the capillaries. The pore size distribution can be matched by changing the size of the upstream and downstream sections of contraction-expansion capillaries, while the throat size distribution can be matched by adjusting the size of the contractions. For networks made of straight capillaries, pore-size and throat-size distributions can be merged into a single distribution, which can be matched by changing the size of the capillaries. Suppressing or adding capillaries at a node can help matching the coordination number distribution function. Inter-changing capillaries can help matching correlation functions. Several iterative methods can be applied to this matching problem. Conventionally, these methods are time consuming because of all the information to be matched and because of the large size of realistic networks. Thanks to the stochastic homogenisation, all this information appears as statistical input, parameters in the analytical formula used to predict $\mu_{app}$. Therefore, matching all the above information is direct and takes little time, as no numerical computation is required. P. Adler, J. F. Thovert, *Fractures and fracture networks*, Kluwer Academic Publishers, 1999.

Figure 3:
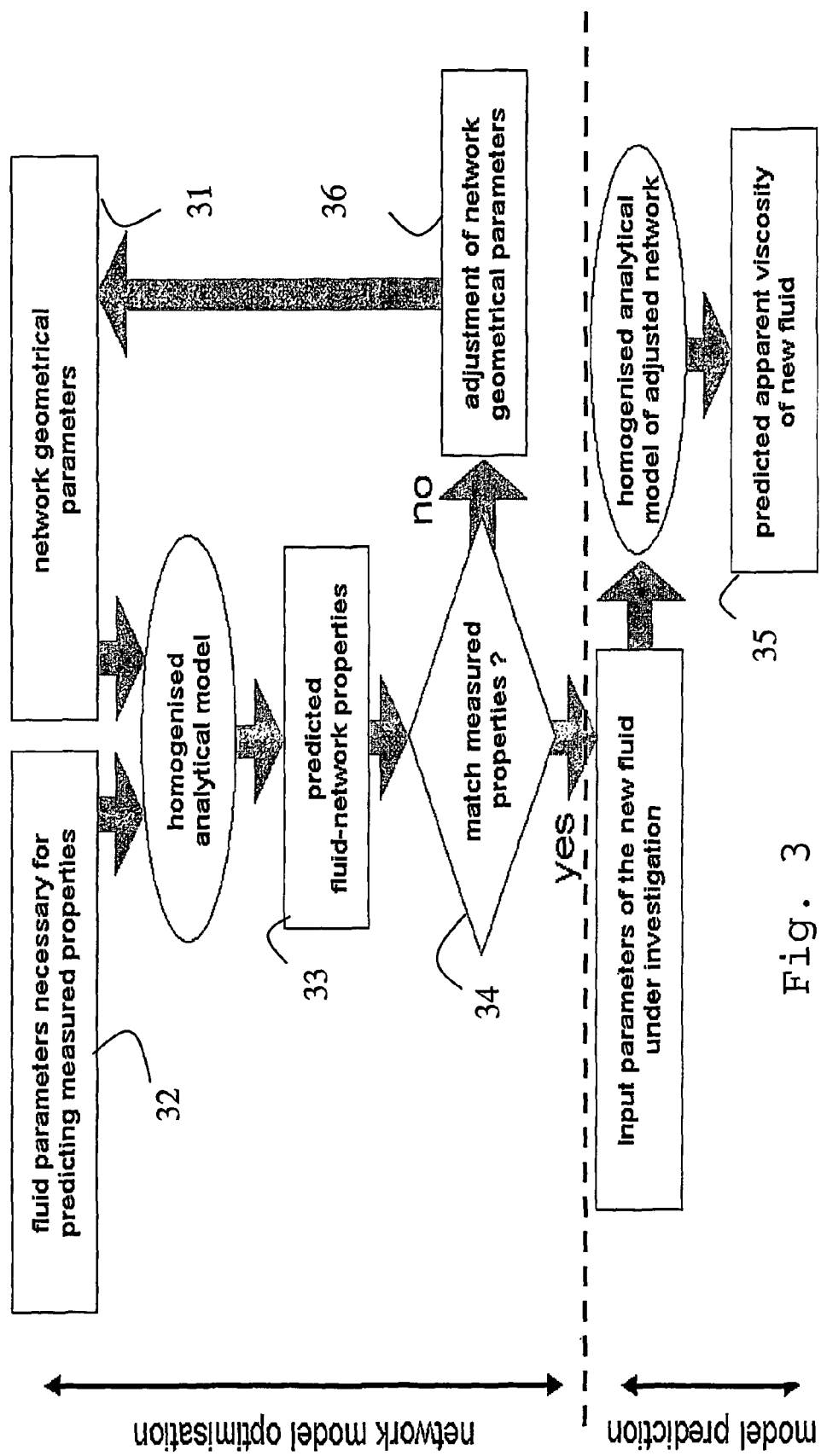
FIG. 3 is a schematic diagram showing various steps of the method according to the invention, as applied to the predicting of the apparent viscosity of a non-Newtonian fluid in a porous medium.

In a fourth step, the network statistics can be adjusted, iteratively, in order to match known properties of the porous medium M, using fluid-dependent information. In FIG. 3, there is shown the example of an iterative loop to optimize the geometrical parameters 31 of the network using fluid parameters 32. (FIG. 3). Indeed, if additional fluid-dependent information is available, such as the permeability of M to Newtonian fluids and the apparent viscosity for another non-Newtonian fluids F', this information should be used. If $\mu_{app}$ is to be predicted, it is desirable that the network model used to represent M also matches this additional information. Practically, there are two cases as follows.

If all the information mentioned in the third step is known, there is no other possible adjustment of the network, as any other network realization with the same statistics provides the same information such as permeability and apparent viscosity for another non-Newtonian fluids. Whether the initial network actually predicts 33 the known fluid-dependent information can then be tested 34. The test is straightforward and again takes no time.

There are two cases:

If the test is positive, then the initial network, as after the third step, can be used as such to predict $\mu_{app}$ 35 If the test is negative, a re-interpretation of the third step statistics and, in particular, the link between the initial network statistics and the dimensions of the capillaries, may be required 36. For example, if the medium M is not large enough compared to correlation lengths, some discrepancy may appear between the prediction from stochastic homogenisation and experimental results. Indeed, stochastic homogenisation predicts properties in the limit of very large sample dimension for the medium M compared to the largest correlation scale of the geometrical parameters. Otherwise, a Monte Carlo approach may be required. In practice, the average result is more important that the result for a single medium.

If not all the information mentioned in the third step is known, then the missing information is adjusted in order to match the additional fluid dependent information. A conventional optimisation algorithm can perform the adjustment of the missing information, where the objective function corresponds to the matching of the fluid-dependent information. This optimisation step is to be performed on the analytical formula from the stochastic homogenisation.

There are two cases:

If the matching of the fluid-dependent information is successful after n says iterations, then a new network statistics can be used to predict $\mu_{app}$.

If the matching of the fluid-dependent information is not successful after n iterations, then a re-interpretation as above is to be considered.

Finally, in a fifth step, $\mu_{app}$ is predicted for the fluid F flowing in the porous media M by performing a stochastic homogenisation of said flow equations, for said network statistics.

Actually, these statistics are used as input parameters for the analytical formula of $\mu_{app}$ obtained through stochastic homogenisation. No simulation is required and results are obtained directly. The homogenisation procedure is outlined hereunder.

The stochastic homogenisation is performed on the following set of equations.

$$\begin{cases} q_{ij} = c_{ij}(p_i - p_j) \text{ for all pair of connected node } i \text{ and } j \\ \sum_{j \in V(i)} q_{ij=0} \text{ for all node } i \end{cases} \quad (3)$$

where the indices i or j indicate the node number, indices ij indicate the capillary connecting node i to j, $q_{ij}$ is the flow-rate through capillary ij, $c_{ij}$ is the so-called conductance of this capillary, $p_i$ is the pressure at node i and V(i) is the set of indices j corresponding to the nodes connected to node i. In the set of equations (3), the first equation is a momentum balance and the second equation is a volume or mass balance equation. There are as many first equations as there are capillaries in the network and as many second equations as there are nodes in the network. In general, $c_{ij}$ is a function of the absolute value of $q_{ij}$, the rheological parameters of fluid F necessary for the modelling mentioned in the second step of the previous section, and one the dimensions of the capillary. For non-Newtonian fluids, the above system is a non-linear set of equations.

The stochastic homogenisation of network equations involves a perturbation based on a stochastic representation of the parameters of said network equations. It is aimed at determining the mean flow-rate Q within the network for a given pressure-gradient $\Delta p/L$ applied across the overall network of length L and cross-section A. This means that the flow-rate can be directly linked to the filtration velocity V in equation (1) as $$\frac{Q}{A} = V = K_c \frac{\Delta p}{L}. \quad (4)$$

The homogenisation provides the value of effective conductivity $K_e$. Then, the apparent viscosity $\mu_{app}$ of the fluid F is determined as follows: firstly, a Newtonian fluid is considered, where the only unknown in equation (1) is the effective permeability $k_e$. Indeed, by definition, for a Newtonian fluid:

$$K_e = \frac{k_e}{\mu}. \quad (5)$$

Then, $k_e=\mu K_e$(Newtonian).

Secondly, $\mu_{app}$, which is the only unknown in equation (2), is determined from the following equation:

$$K_e = \frac{k_e}{\mu_{app}} \quad (6)$$

The results of the stochastic homogenisation correspond to a second order analysis, which involves the two-point correlation function of the distribution of the network parameters. Actually, the network equations (3) can be interpreted as an integrated version of the continuum point-wise equations relating the filtration velocity $V(x)$ to the pressure gradient $\nabla p(x)$. Indeed, these equations write:

$$\begin{cases} V = -K\nabla p \\ \nabla \cdot V = 0 \end{cases} \quad (7)$$

Figure 4A:
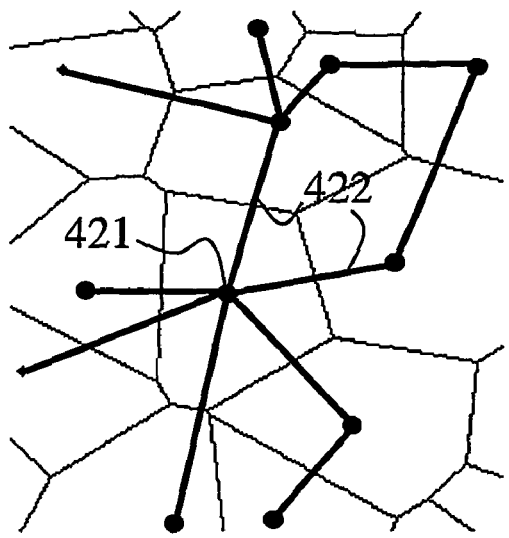
FIGS. 4A and 4B illustrate the relation between the continuum and network interpretation and the use of Voronoi cells, each point denoting a node in the network.
Figure 4B:
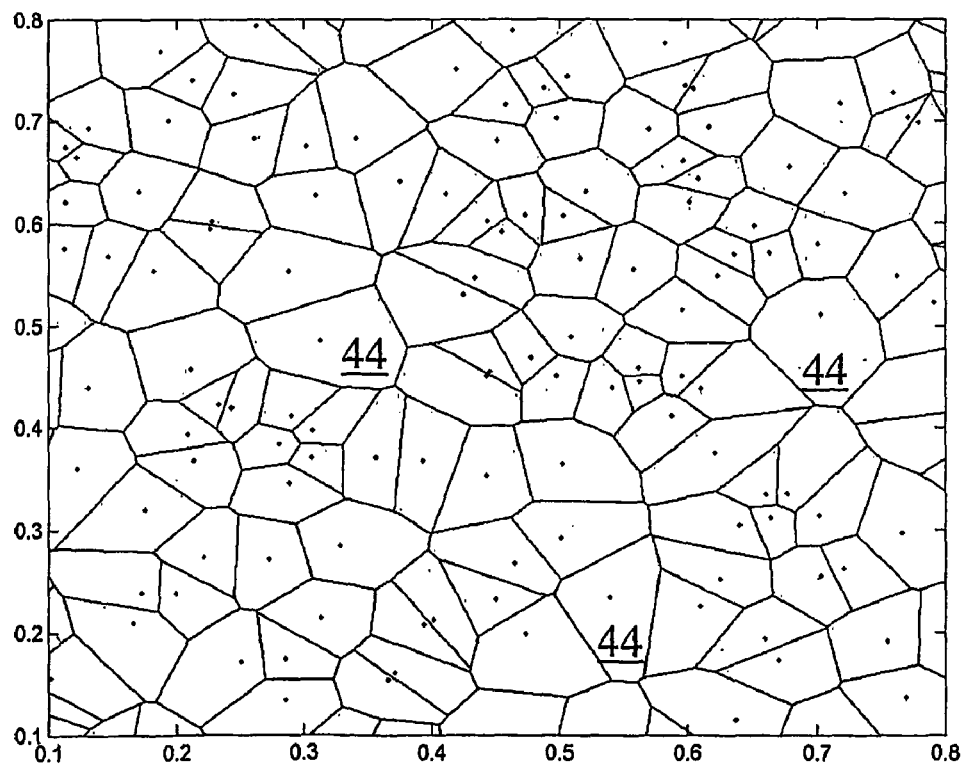

Consider a point x locating a pore of the network, and a small volume $\Omega(x)$ containing this pore 421 and intersecting all the throats 422 connecting this pore to its neighbours as depicted in FIG. 4A. The network may be assimilated to a set of Voronoi cells 44 as shown in FIG. 4B. Then, the network equations (3) and their continuum counterparts (7) are related as follows.

The volume or mass conservation can be rewritten as:

$$\int_{\partial\Omega} V(x') \cdot n\, ds = \sum_j \int_{\Gamma_{ij}} V(x') \cdot n\, ds = 0 \rightarrow \sum_j q_{ij} = 0 \quad (8)$$

where $q_{ij}$ is the flow rate through the surface $\Gamma_{ij}$, corresponding to the flow in the direction $n_j$. Now integrating the flux over a particular cell interface $\Gamma_{ij}$, the following equation, (9), is obtained:

$$q_{ij} = \int_{\Gamma_{ij}} V(x') \cdot n\, ds = -\int_{\Gamma_{ij}} K(x')\nabla p \cdot n\, ds \quad (9)$$

Assuming $K(x')$ is constant along $\Gamma_{ij}$, $K(x')=K_{ij}$, and taking an estimate of $\nabla p(x').n$ as $$\nabla p \cdot n \approx \frac{p_j - p_i}{l_{ij}} \equiv \frac{\Delta p_{ij}}{l_{ij}}. \quad (10)$$

where $l_{ij}$ is the distance between the connected pores i and j. Finally, the relationship between equations (3) and (7) is given by:

$$c_{ij} = K_{ij} s_{ij} \quad (11)$$

with $s_{S_{ij}}$ the area of the boundary $\Gamma_{ij}$. Based on this equation (11), it is possible to apply the formula (as equation (12)) developed in a continuum framework.

Figure 5:
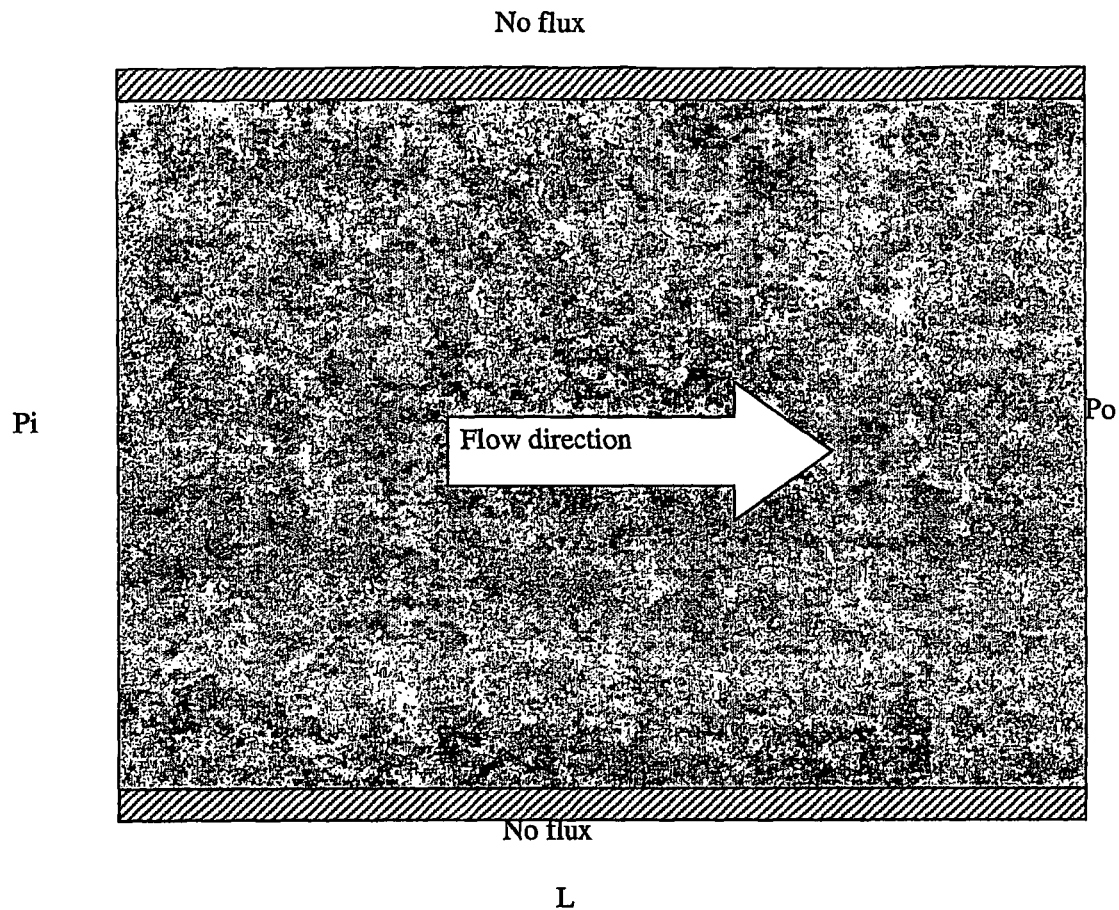
FIG. 5 shows the boundary conditions used in the numerical simulation according to FIGS. 7 for the validation of the formula on non-Newtonian power-law fluids.

The effective conductivity $K_e$ is a symmetric second order tensor of which the components are given by an explicit analytical formula. The component $K_{e11}$ (note that here subscripts related to the tensor component and not the indices of the nodes) is given by the following formula, (12), corresponding to the flow configuration depicted in FIG. 5:

$$K_{e11} = \overline{K}\exp\left(\frac{\sigma^2}{2}\int_{R^d} \frac{w \cdot w(w \cdot w - 2w_1^2)}{[w \cdot w + A_0^1|\nabla P_{01}|w_1^2]^2} S_{a^0 a^0}(w)dw\right), \quad (12)$$

where $$\overline{K}=\exp(A_0^0-\sigma^2|\nabla P_{01}|I_1+\sigma^2 A_0^1|\nabla P_{01}|I_2+\sigma^2(A_0^2|\nabla P_{01}|^2-A_0^1|\nabla P_{01}|)I_3).$$

The integrals $I_i$ are spectral integrals given by $$I_1 = \int_{R^d} \frac{w_1^2}{[w\cdot w + A_0^1|\nabla P_{01}|w_1^2]^2} S_{a^0 a^1}(w)dw \quad (14)$$

$$I_2 = \int_{R^d} \frac{w \cdot w w_1^2}{[w\cdot w + A_0^1|\nabla P_{01}|w_1^2]^2} S_{a^0 a^0}(w)dw$$

$$I_3 = \int_{R^d} \frac{w_1^4}{[w\cdot w + A_0^1|\nabla P_{01}|w_1^2]^2} S_{a^0 a^0}(w)dw$$

Last, the others parameters are defined as follows $$A_0^0 = \langle \ln K(x, |\nabla P_{01}|)\rangle \quad (15)$$

$$A_0^1 = \left\langle \frac{\partial \ln K}{\partial \|\nabla P\|}(x, |\nabla P_{01}|)\right\rangle \quad \text{and}$$

$$A_0^2 = \left\langle \frac{\partial^2 \ln K}{\partial \|\nabla P\|^2}(x, |\nabla P_{01}|)\right\rangle$$

$$\sigma a^0 = \ln K(x, |\nabla P_{01}|) - \langle \ln K(x, |\nabla P_{01}|)\rangle$$

$$\sigma a^1 = \frac{\partial \ln K}{\partial \|\nabla P\|}(x, |\nabla P_{01}|) - \left\langle \frac{\partial \ln K}{\partial \|\nabla P\|}(x, |\nabla P_{01}|)\right\rangle$$

$$\sigma a^2 = \frac{\partial^2 \ln K}{\partial \|\nabla P\|^2}(x, |\nabla P_{01}|) - \left\langle \frac{\partial^2 \ln K}{\partial \|\nabla P\|^2}(x, |\nabla P_{01}|)\right\rangle$$

The parameter $\sigma$ is used as a normalising parameter quantifying the amplitude of the fluctuations and may be chosen as the standard deviation of the most relevant fluctuation in the flow problem. In the following example, the parameter a is chosen as the standard deviation of the log-radii distribution.

EXAMPLE

In the present example, a power-law fluid flowing in a statistically stationary and non-isotropic network is considered. The following results are derived based on the formal similarity of equations (3) and (7). The model describing the local conductivities can be written:

$$c_{ij} = \pi\left(\frac{n}{3n+1}\right)\left(\frac{1}{2\mu}\right)^{1/n} r_{ij}^{(3n+1)/n}\left(\frac{\Delta p_{ij}}{l_{ij}}\right)^{(1-n)/n} \quad (16)$$

so that the logarithm and the derivatives of these conductivities, taken at $\Delta p_{ij}/l_{ij}=\Delta p/L$, can be written:

$$\ln c_{ij}\left(\frac{\Delta p}{L}\right) = \ln\left(\pi\left(\frac{n}{3n+1}\right)\left(\frac{1}{2\mu}\right)^{1/n}\right) + \frac{3n+1}{n}\ln r_{ij} + \frac{1-n}{n}\ln\left(\frac{\Delta p}{L}\right) \quad (17)$$

$$\frac{\partial \ln c_{ij}}{\partial(\Delta p_{ij}/l_{ij})}\left(\frac{\Delta p}{L}\right) = \frac{1-n}{n}\left(\frac{\Delta p}{L}\right)^{-1}$$

-continued $$\frac{\partial^2 \ln c_{ij}}{\partial (\Delta p_{ij}/l_{ij})^2}\left(\frac{\Delta p}{L}\right) = -\frac{1-n}{n}\left(\frac{\Delta p}{L}\right)^{-2}$$

Using variable c instead of $c_{ij}$ and r instead of $r_{ij}$, and using decompositions similar to equations (15), the following equations, (18), are obtained:

$$I_1 = 0 \quad (18)$$

$$I_2 = \int_{R^d} \frac{nw \cdot w w_1^2}{[nw \cdot w + (1-n)w_1^2]^2} S_{a^0 a^0}(w) dw$$

$$I_3 = \int_{R^d} \frac{nw_1^4}{[nw \cdot w + (1-n)w_1^2]^2} S_{a^0 a^0}(w) dw$$

where $a^0$ is the normalised fluctuation of the log-conductivity, ln c, function of the mean pressure gradient. Letting $\rho$=ln r, it appears that:

$$\sigma = \left(\frac{3n+1}{n}\right)\sigma_\rho \text{ and } S_{a^0 a^0} = S_{\rho\rho} \quad (19)$$

where $\sigma_p$ is the standard deviation of the probability distribution of the log-radii, and $S_{pp}$ is the spectral density of $\rho$. Let $$c_g = \pi\left(\frac{n}{3n+1}\right)\left(\frac{1}{2\mu}\right)^{1/n}\left(\frac{\Delta p}{L}\right)^{(1-n)/n} r_g^{(3n+1)/n} \quad (20)$$

with $r_g$=exp(<ln r>) the geometric mean of r. Then, the effective conductivity $C_e$ of the network is given by the following formula:

$$c_e = c_g \exp\left(\frac{\sigma_\rho^2}{2}\left(\frac{3n+1}{n}\right)^2 \int_{R^d} \frac{n(w \cdot w - 2w_1^2)}{[nw \cdot w + (1-n)w_1^2]^2} S_{\rho\rho}(w) dw\right) \quad (21)$$

For general spectral densities, evaluation of equation (21) may require numerical evaluation but, still, this does not require many computer resources. For some model, this integral can be carried out analytically. For example, for the following anisotropic exponential model, expressed in a coordinate system aligned with the anisotropy of the medium, $$\begin{cases} R_{\rho\rho}(\xi_1, \xi_2) = \exp\left(-\sqrt{\left(\frac{\xi_1}{l_1}\right)^2 + \left(\frac{\xi_2}{l_2}\right)^2}\right) \\ S_{\rho\rho}(w_1, w_2) = \frac{1}{2\pi} \frac{l_1 l_2}{[1+(l_1 w_1)^2+(l_2 w_2)^2]^{3/2}} \end{cases} \quad (22)$$

where $l_i$ and $l_2$ are the correlation lengths scales, a direct integration is possible leading the following explicit formula $$c_e(n) = c_g \exp\left(\frac{\sigma_\rho^2}{2}\left(\frac{3n+1}{n}\right)^2 \frac{\sqrt{n}(\varepsilon - \sqrt{n})}{1+\varepsilon\sqrt{n}}\right) \quad (23)$$

where $\varepsilon = l_1/l_2$ is the anisotropy ratio. Following equations (5) and (6), the apparent viscosity $\mu_{app}$ is obtained as $$\mu_{app} = \mu \frac{c_e(1)}{c_e(n)}. \quad (24)$$

Expanding this expression in terms of the mean flow rate Q rather than in terms of the mean pressure drop $\Delta p/L$, the following equation (25) is then obtained:

$$\mu_{app} = \mu \frac{\pi^{1-n}}{4}\left(\frac{3n+1}{n}\right)^n r_g^{3(1-n)} \quad (25)$$

$$\exp\left(\frac{\sigma_\rho^2}{2}\left(16\frac{\varepsilon-1}{1+\varepsilon} - \left(\frac{3n+1}{n}\right)^2 \frac{n\sqrt{n}(\varepsilon-\sqrt{n})}{1+\varepsilon\sqrt{n}}\right)\right) Q^{n-1}.$$

In this section, numerical results with formula (25) for a non-isotropic 2D network described below are given. The aim is to prove that analytical models derived from stochastic homogenisation of network equations give an accurate estimate of the apparent viscosity as calculated by a network simulator. The network is a Cartesian or square network, with a local coordination number of 4, as depicted in FIG. 6. The networks comprises 256×256 nodes and the anisotropy is such that $\varepsilon$=2 in equation (25). A map of the capillaries in the horizontal direction is given in FIG. 7C. The probability distribution function of the capillaries radii is given in FIG. 7B. The agreement between $\mu_{app}$ calculated with equation (25) and that obtained numerically by solving equations (3) numerically is illustrated in FIG. 7A. The agreement is very good. Determining the rheograms in FIG. 7A by solving equations (3) for such network takes about 4-5 hours. It takes a fraction of a second to compute equation (25).

Hence, the method of the invention shows the following advantages:—rapidity, as it does not require any numerical simulation,—relevance to the fluid under investigation, as it does not require its REOS but its effective capillary flow parameters, determined experimentally, even if REOS could be used if available and preferred;—tractability and informative power as the stochastic homogenisation technique provides an analytical formula linking flow parameters in porous media to the statistics of the network geometrical parameters; and—relevance to the rock or porous medium under investigation, as the network statistics, from which calculations are made, reproduce known properties of the studied porous medium as a result of an optimisation algorithm of the network statistics building process.

While the invention has been described in conjunction with the exemplary embodiments described above, many equivalent modifications and variations will be apparent to those skilled in the art when given this disclosure. Accordingly, the exemplary embodiments of the invention set forth above are considered illustrative and not limitative. Various changes to the described embodiments may be made without departing from the scope of the invention.

The invention claimed is:

1. A method for predicting the apparent viscosity of a non-Newtonian fluid in a heterogeneous porous medium, comprising the following steps:
    choosing a capillary type with a given set of geometrical parameters;
    determining flow equations for said non-Newtonian fluid in said capillary type; and
    operating apparatus which comprises a processor and a data storage memory to determine a network statistics for a network of chosen capillaries having a distribution of characteristic parameters and to perform a stochastic homogenisation of said flow equations, for said network statistics, wherein the stochastic homogenisation is performed on the following set of equations:

$$\begin{cases} q_{ij} = c_{ij}(p_i - p_j) \text{ for all pair of connected node } i \text{ and } j \\ \sum_{j \in v(i)} q_{ij=0} \text{ for all node } i \end{cases}$$

where the indices i or j indicate the node number, indices ij indicate the capillary connecting node i to j, $q_{ij}$ is the flow-rate through capillary ij, $c_{ij}$ is the so-called conductance of this capillary, $p_i$ is the pressure at node I and V(i) is the set of indices j corresponding to the nodes connected to node i.

2. A method for predicting the apparent viscosity $\mu_{app}$ of a non-Newtonian fluid in a heterogeneous porous medium, comprising the following steps:

choosing a capillary type with a given set of geometrical parameters;

determining flow equations for said non-Newtonian fluid in said capillary type; and operating apparatus which comprises a processor and a data storage memory to determine a network statistics for a network of chosen capillaries having a distribution of characteristic parameters and to perform a stochastic homogenisation of said flow equations, for said network statistics, wherein the apparent viscosity $\mu_{app}$ is determined using the following set of equations:

$$\frac{Q}{A} = V = K_e \frac{\Delta p}{L},$$

$$K_e = \frac{k_e}{\mu}, \text{ and } K_e = \frac{k_e}{\mu_{app}}$$

where Q is the mean flow-rate within the network for a given pressure-gradient $\Delta p/L$ applied across the overall network of length L and cross-section A, V is the filtration velocity, $\mu$ is the Newtonian fluid viscosity, $K_e$ the effective conductivity, and $k_e$ is the effective permeability.

3. The method of claim 1, wherein flow equations are determined experimentally through single capillary-flow results.

4. The method of claim 1, wherein flow equations are determined using a direct simulation on said capillary type.

5. The method of claim 2, wherein $K_e$ is a symmetric second order tensor of which the components are given by explicit analytical formula.

* * * * *